United States Patent Office 3,157,519
Patented Nov. 17, 1964

3,157,519
METHOD OF PACKAGING VISCOUS MATERIALS
Frederick J. Butt, Midland, Mich., assignor to The Dow Chemical Company, Midland, Mich., a corporation of Delaware
No Drawing. Filed June 13, 1962, Ser. No. 202,061
4 Claims. (Cl. 99—171)

This invention relates to a method of packaging viscous and gel-like materials. It more particularly relates to a method of packaging such materials under a reduced pressure in synthetic resinous containers.

Much difficulty has been encountered in the packaging of viscous gel-like materials including such high viscosity materials as greases, cream cheese, mayonnaise, jellies, jams, peanut butter, salad dressing, petroleum jellies, lubricating greases, detergent compositions and the like. Many of these materials are packaged while hot in order that the viscosity of the material is a minimum and the packaging may be accomplished without difficulty or, alternately, they may be vacuum packed in order to eliminate the bubbles and other gaseous voids that occur. Hot and/or vacuum packing usually results in a reduced pressure in the container under normal conditions. The term "normal conditions" as used herein refers to the usual storage temperatures encountered such as 40° Fahrenheit to 120° Fahrenheit at prevailing atmospheric pressure.

When high viscosity liquids or gels are packed in transparent resinous containers, bubbles appear after a period of time at an interface between the container and its contents. Bubble formation is particularly evident when transparent containers are employed. It was frequently presumed that the relatively high gas transmission rates of resinous materials were responsible for the appearances of gas bubbles or pockets on the interface between the container and its contents. A package exhibiting gas bubbles at the interface is not commercially acceptable since, as can readily be appreciated, such phenomenon spoils the aesthetic appeal of the package. It may even suggest to some that the contents are not fresh or have begun to deteriorate with the evolution of gas. Consequently, clear plastic materials have not achieved general acceptance for use in the vacuum or reduced pressure packing of viscous materials.

Certain techniques utilizing preheating or elaborate vacuum treatments of the plastic containers prior to packaging are known in the art and require relatively bulky voluminous and expensive equipment in order to prepare the container to receive the packaged material. Such techniques require much laborious handling and careful timing of treatment and filling in order to gain the desired result. Many benefits and advantages could be achieved if a method were available that was capable of providing a clear or transparent plastic container to be utilized in vacuum or reduced pressure packing operations which would not exhibit interfacial bubbling between the container and the contents. Clear plastic containers are relatively low in cost, are extremely easily formed, and are available in a wide variety of shapes and sizes. The dies or other forming means utilized in the fabrication of such containers may be altered as desired with a minimum of time, mechanical facilities and expense.

It is an object of this invention to provide a method of packing viscous gel-like liquids in plastic containers without subsequent formation of gas bubbles at the interface.

It is a further object of this invention to provide a method of packaging viscous gel-like materials utilizing ultrasonic energy.

It is a further object of this invention to provide a method of packaging viscous gel-like liquids to provide a bubble-free package having its contents under reduced pressure.

These and other objects, advantages and benefits are obtained by providing a thermoplastic resinous container introducing a quantity of viscous gel-like material into said container, exciting said container by means of ultrasonic vibrations until no gas is observed rising within the liquid, sealing said container hermetically in a manner to result in a reduced pressure therein.

Various shapes and types of rigid transparent resinous containers are suitable for practice of the invention. Conventional glass shapes may be readily duplicated such as high and low cylindrical forms in either wide or narrow mouth styles. Plastic containers with or without ornamentation or labeling matter are readily prepared. The closure usually employed with glass containers such as screw-on and snap-on covers are readily utilized with plastic vessels as well as closures and techniques peculiar to plastics such as heat, solvent or adhesive seals. Such containers or jars are of relatively rigid construction and of sufficient strength that they do not deform under the atmospheric pressure when the internal absolute pressure is in the range of 300 millimeters of mercury absolute.

Any of a wide variety of clear plastics may be employed to make the containers used in the practice of the invention. Such containers are readily formed by injection molding, vacuum forming, compression molding, and other similar well-known techniques for forming articles of plastic or resinous materials.

The plastic materials that may be utilized include alkenyl aromatic resins such as polystyrene and its related homologs, analogs and isomers, polyvinyl chloride and copolymers of vinyl chloride, copolymers of vinylidene chloride, cellulosic resins, ethyl cellulose, and cellulose acetate, cellulose acetate butyrate, polyamide resins such as "Nylon 6," a condensation product of $\epsilon$ caprolactam, "Nylon 66," a condensation product of adipic acid and adiponitrile, polyethylene, polypropylene, and copolymers thereof, and the like or equivalent plastic materials of construction. Selection of the specific plastic to be used depends primarily upon the particular viscous material which is to be packed. Ordinarily, despite contrary prior impressions, the gas and bubble formation within the clear plastic container employed in the vacuum packing of viscous liquids is not dependent on the gas transmission rate through the wall. The gassing at the interface appears to be in part dependent upon the history of the plastic material utilized in the fabrication of the rigid container and in part upon the history of the container itself immediately prior to packaging. It is believed that gas is sorbed onto or into the plastic material and is subsequently liberated when the container is filled and sealed resulting in the unsightly bubble formation.

Suitable containers for the practice of the invention are prepared by a variety of methods including injection molding compression, molding, vacuum forming, and the like. Ultrasonic vibration may be applied to the containers during filling by a wide variety of means such as direct mechanical coupling of a vibrating mechanical body, such as a transducer probe or an ultrasonic oscillating holder which provides a rigid coupling of the energy from the holder to the container. In certain instances, beneficially the container is supported in a liquid bath such as a water bath and the bath in turn subjected to ultrasonic vibrations, the liquid serving to transmit the vibrations to the container. Alternately, the ultrasonic energy may be applied by immersing an oscillating probe into the material being packed. Generally all ultrasonic vibrations ranging in frequency from about 15 kilocycles per second to about 2 megacycles per second may be utilized but generally the lower portion of the frequency range is most beneficially employed as the mass of the containers is relatively large compared to the web length of the energy in the container. Generally it is desirable to utilize frequency of from about 18 kilocycles to about 80 kilocycles. Suitable excitation means for such frequencies are well known in the art and such valid transducers as the piezo electrical and magnetostrictive types are beneficially employed.

In the practice of the invention it is usually advantageous to place the container adjacent and below a suitable filling spout. The container should be coupled to a source of ultrasonic energy, the viscous gel-like material added while maintaining the ultrasonic vibration of the container until after filling has been completed and most small gas bubbles can be observed rising to the top surface of the material within the container. In situations where contents of the container are added in a heated condition generally it is sufficient to apply a hermetic seal to the container and on cooling to ambient temperatures a reduced pressure results therein. If the pressure reduction is not achieved through the lowering of the trapped gas temperature within the container sealing may be accomplished in a chamber under reduced pressure and a similar result obtained. The container may be filled with the liquid material being packaged and beneficially subsequently subjected to the ultrasonic vibration to dislodge the undesired gas prior to sealing. The container may be sealed, and if the volume of the dislodged gas is not objectionable, the container is then subjected to ultrasonic vibration. The degassing must be carried out before the gel-like material has set. Generally it is beneficial to degas the package and contents at a temperature above ambient temperature such as, for example, in the case of a jelly at a temperature above 160° Fahrenheit and below the boiling point of the jelly mixture. The time required to degas the container and contents will decrease as the temperature approaches the boiling point of water and the viscosity of the mixture is decreased by the increase in temperature. Conversely as the temperature of the viscous gel-like material is lowered and the viscosity increases, gellation may occur. A more prolonged application of ultrasonic energy is necessary in order to induce the bubbles to rise to the surface of the liquid. Typically in the packaging of grape jelly in injection molded polystyrene tumblers, full degassing is obtained utilizing ultrasonic energy at a frequency of about 20 kilocycles per second for a period of about 2 to 5 seconds. Frequently as the viscosity is increased treatment times of 5 minutes, 10 minutes and even longer are desirable. Generally shorter agitation times are required if vigorous excitation is utilized, while longer periods are required with a less violent treatment.

*Example I*

By way of further illustration, three 11 ounce injection molded polystyrene tumblers were filled with a freshly prepared grape jelly at a temperature of about 190°. The grape jelly was prepared by heating two cups of commercial canned grape juice of the natural unsweetened variety with one and one half pounds of sugar until the mixture boiled. When the boiling point was reached, 93 milliliters of a fruit pectin preparation (commercially available under the trade name "Certo") were added. Additional heat was applied and the mixture brought to a vigorous boil and maintained thereat for a period of one minute. The heat was removed from the mixture, the jelly was skimmed, and cooled to about 190° Fahrenheit. The jelly was then poured into the polystyrene tumblers. The tumblers were then placed in an ultrasonically activated water bath which had a temperature of 112° Fahrenheit. The water bath was excited by means of a 125 watt ultrasonic generator through a transducer directly coupled to the bottom of the water bath and oscillating at a frequency of about 40 kilocycles per second. The containers containing the hot jelly were treated in the ultrasonic bath for a period of about 2 minutes. The tumblers were then hermetically sealed and cooled to about 70° Fahrenheit, which resulted in internal pressure of about 400 millimeters of mercury absolute and after storage for an extended period of time, no formation of bubbles at the interface between the jelly and the container could be found. The foregoing example is repeated with the exception that no ultrasonic energy was applied to the tumblers. After storage for 16 hours at about 75° Fahrenheit, a layer of fine bubbles was observed at the interface between the jelly and the container even though no such bubbles were observed when the tumblers were initially filled and sealed.

*Example II*

The procedure of Example I was repeated with the exception that polypropylene tumblers were utilized instead of polystyrene tumblers. Commensurate results were obtained.

Equally bubble-free packages of strawberry jam, peach preserves, raspberry jam, plum jam, mint jelly, peanut butter, mayonnaise, salad dressing, orange marmalade, jelled hydrocarbon lubricants, jelled detergents, salves and ointments and the like are obtained by employing ultrasonic treatment of containers fabricated from polyethylene, cellulose acetate, polyvinyl chloride, copolymers of vinyl chloride, ethyl cellulose, copolymers of styrene and similar plastics.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of packaging a viscous material in a thermoplastic resinous container, the viscous material on standing at ambient temperatures retains gas bubbles which do not rise to the upper surface thereof, the steps of the method comprising:
   introducing a quantity of said material into said container at a temperature of at least 160° Fahrenheit,
   subjecting said container to ultrasonic vibrations, having a frequency of from about 15 kilocycles per second to about 2 megacycles per second until no gas is observed rising within the material,
   sealing said container hermetically,
   cooling said container and contents to a temperature below 160° Fahrenheit and
   thereby providing a reduced pressure therein.

2. The method of claim 1, wherein said container is subjected to ultrasonic vibrations by being at least partially immersed in a liquid bath, said liquid bath being subjected to ultrasonic vibrations having a frequency of from about 15 kilocycles per second to about 2 megacycles per second.

3. The method of claim 1, wherein said material is grape jelly.

4. The method of claim 3, wherein said grape jelly is added to said container at a temperature above about 190° Fahrenheit.

References Cited in the file of this patent

UNITED STATES PATENTS

| | | |
|---|---|---|
| 2,949,710 | Wheeler | Aug. 23, 1960 |
| 3,034,905 | Weintraub et al. | May 15, 1962 |

OTHER REFERENCES

Robertson, India Rubber World, pages 80–84, October 1952.